Dec. 23, 1952     E. G. ROEHM ET AL     2,622,486
SPINDLE TRANSMISSION AND POSITIONING MECHANISM

Original Filed Oct. 3, 1942              5 Sheets—Sheet 1

INVENTOR.
ERWIN G. ROEHM
HANS FRITSCHI
BY Leigh W. Wright.
ATTORNEY.

Dec. 23, 1952     E. G. ROEHM ET AL     2,622,486
SPINDLE TRANSMISSION AND POSITIONING MECHANISM
Original Filed Oct. 3, 1942     5 Sheets-Sheet 2

INVENTOR.
ERWIN G. ROEHM
HANS FRITSCHI
BY Leigh W. Wright
ATTORNEY.

Patented Dec. 23, 1952

2,622,486

UNITED STATES PATENT OFFICE 2,622,486

SPINDLE TRANSMISSION AND POSITIONING MECHANISM

Erwin G. Roehm, Norwood, and Hans Fritschi, Silverton, Ohio, assignors to The Cincinnati Milling Machine Co., Cincinnati, Ohio, a corporation of Ohio Original application October 3, 1942, Serial No. 460,706, now Patent No. 2,489,227, dated November 22, 1949. Divided and this application July 8, 1946, Serial No. 681,854

5 Claims. (Cl. 90—18)

1

This invention relates to machine tools and more particularly to improvements in milling machines.

One of the objects of this invention is to provide an improved automatic spindle start and stop control means and selector mechanism whereby rotation of the spindle may be automatically or manually controlled.

Another object of this invention is to provide improved means for controlling rotation of a machine tool spindle either jointly with movement of the table or independently of table movement.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

This application is a division of our copending application for milling machine, filed in the United States Patent Office on October 3, 1942, Serial No. 460,706, now Patent No. 2,489,227, granted November 22, 1949.

Figure 1:
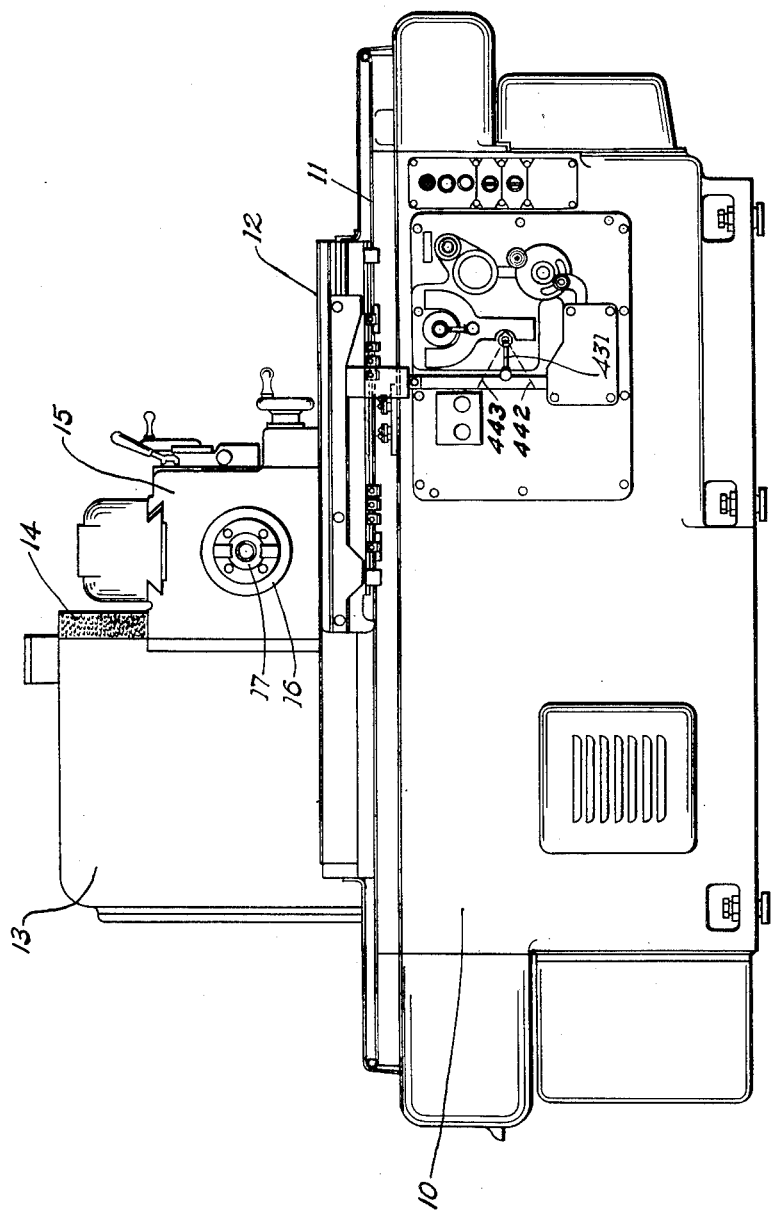
Figure 1 is a front elevation of a machine tool embodying the principles of this invention.
Figures 2, 3, 4:
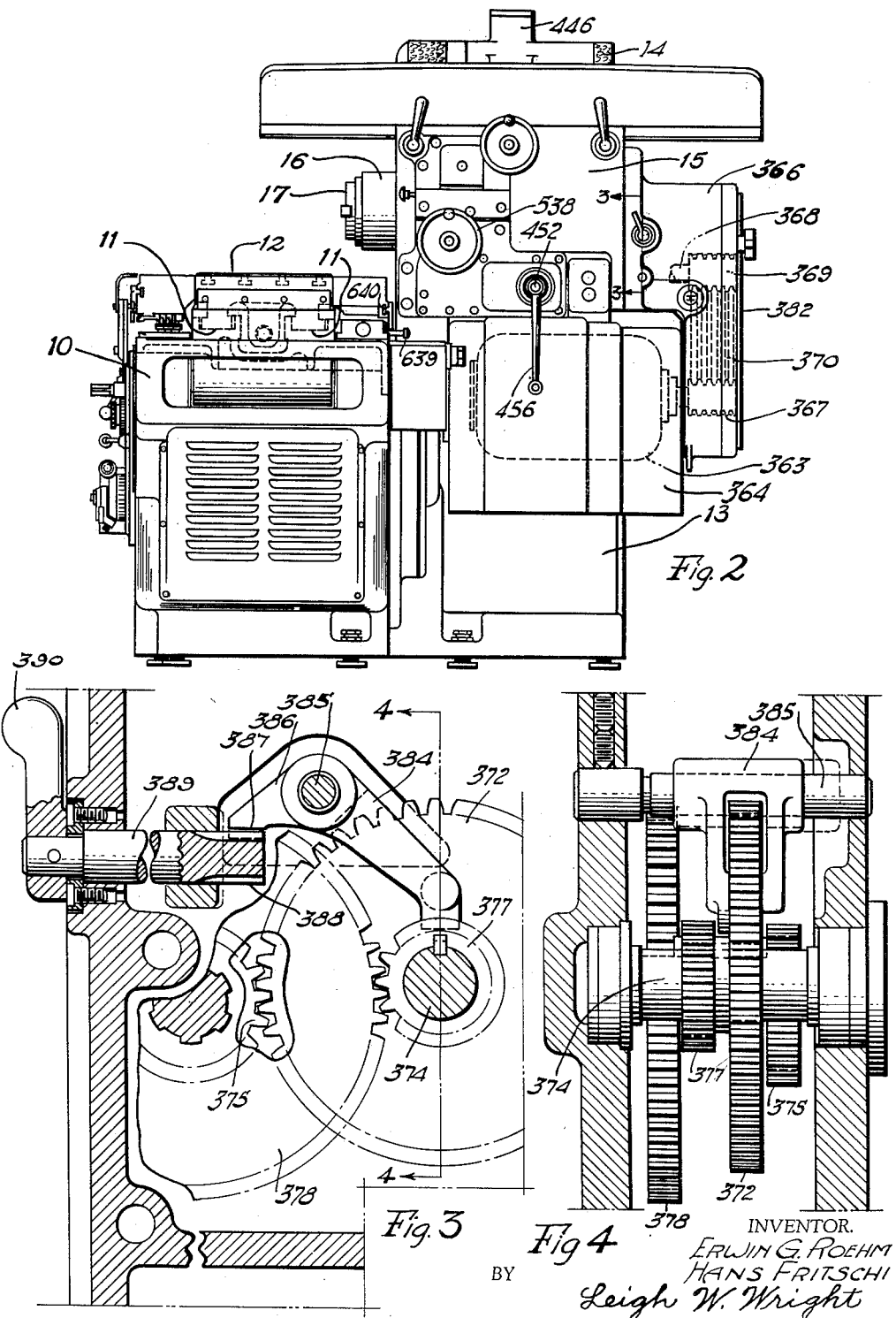
Figure 2 is an end view of the machine as viewed from the right of Figure 1.
Figure 3 is an enlarged detail section on the line 3—3 of Figure 2.
Figure 4 is a section on the line 4—4 of Figure 3.

Referring to the drawings, Figures 1 and 2 show front and side views of a machine tool such as a milling machine embodying the principles of this invention, and from these figures it will be noted that the machine is of the bed type comprising a bed 10 upon the top of which

2 is formed guideways 11 which support a table 12 for horizontal movement; and an upstanding column or headstock 13 which is integrally connected to the bed and provided with guideways 14 formed on one face thereof for receiving a spindle carrier 15 which is vertically movable with respect to the top of the table 12.

Briefly, the spindle carrier has a quill 16 which is slidably mounted in the carrier for horizontal axial adjustment, and a cutter spindle 17 is journaled within the quill for axial movement thereby.

Figure 5:
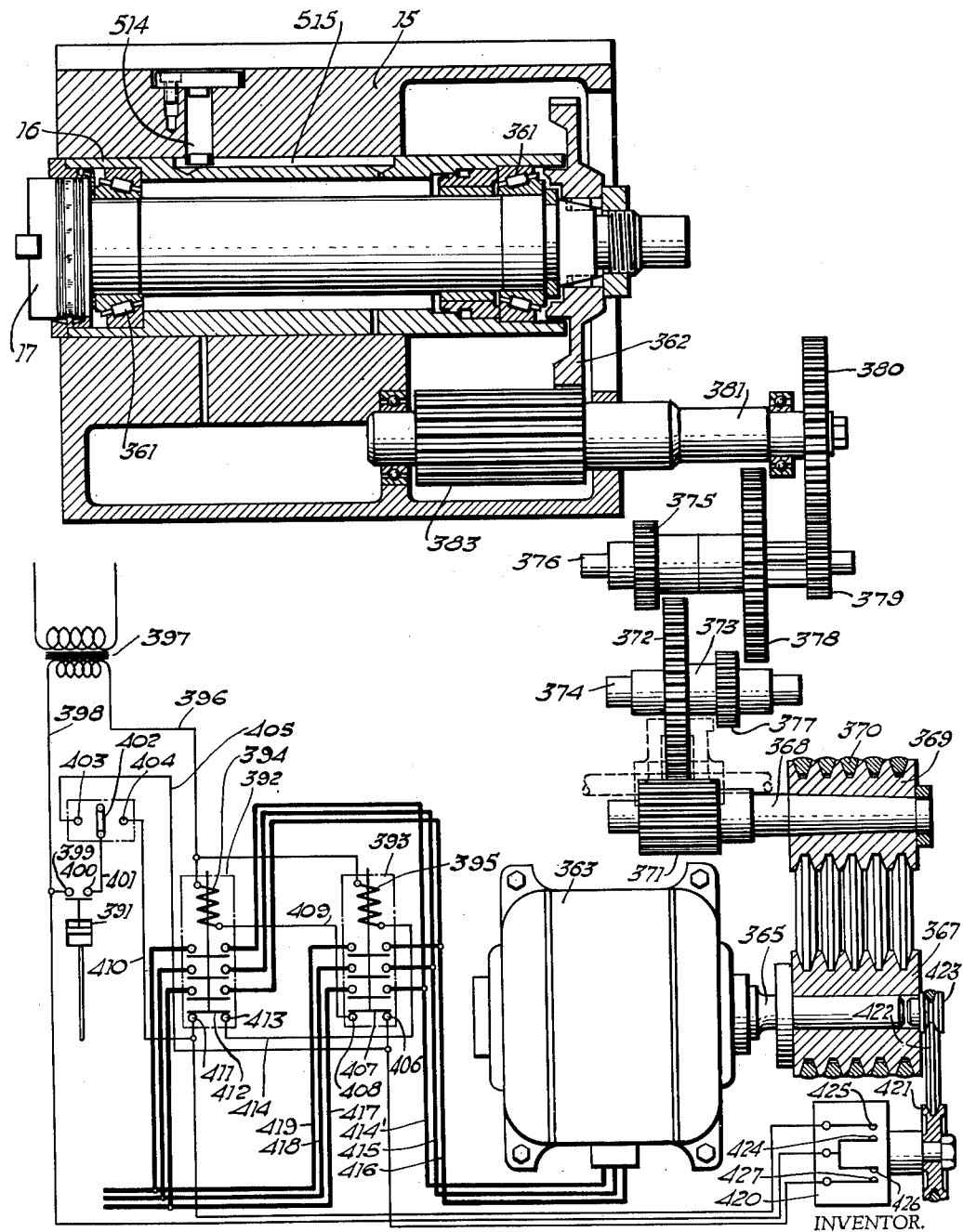
Figure 5 is a view partially diagrammatic of the transmission and control mechanism for the cutter spindle.

The spindle transmission is more particularly shown in Figures 3, 4, and 5. Referring to Figure 5 it will be seen that the spindle 17 is journaled at opposite ends by anti-friction bearings 361 in the quill 16. A large gear 362 is keyed to the end of the spindle for driving the same and this gear receives power through a variable speed transmission from a prime mover in the form of an electric motor 363. Referring to Figure 2, the motor 363 is attached to the underside of the spindle carrier 15 for movement therewith and the motor is enclosed by a housing 364. The armature shaft 365 of the motor extends into a gear box 366 which is attached to the rear end of the spindle carrier. The armature shaft is equipped with a multiple V-groove pulley 367 while the primary shaft 368 has a similar multiple groove pulley 369 and these pulleys are interconnected by a series of V-belts 370.

The shaft 368 carries an elongated pinion 371 for maintaining operative engagement with a slidable gear 372 of a couplet 373. The couplet 373 is splined on a shaft 374 as shown in Figure 3 for sliding movement whereby the large gear 372 may be intermeshed with a smaller gear 375 mounted on a shaft 376, or the small gear 377 of the couplet may be intermeshed with a larger gear 378 also mounted on the shaft 376. This makes possible a selection between high and low speed operation of the spindle. The gears 375 and 378 are splined on the shaft 376 for rotating the shaft and thereby a change gear 379 which may be secured to the end of the shaft. This change gear intermeshes with a change gear 380 secured to the end of shaft 381. The change gears are accessible through a door 382 mounted on the end of the gear box 366 as more particularly shown in Figure 2.

It will be understood that these change gears may be removed and other ratios of gears substituted whereby a selection of speeds for the spindle is made available. The shaft 381 extends into the spindle carrier proper and carries an elongated pinion 383 which meshes with the gear 362. This pinion has been made of considerable length so as to maintain a driving engagement with the gear 362 in spite of axial adjustment of the quill 16.

The shiftable couplet 373 of the spindle transmission may be moved into any one of three positions and to this end is provided with a shifter fork 384 as more particularly shown in Figures 3 and 4, and the shifter fork is slidably mounted on a rod 385. The shifter fork has an extension 386 upon which is formed rack teeth 387 which intermesh with a pinion 388. The pinion teeth are cut directly in the end of a shaft 389 which extends through to the outside of the gear box where it is provided with an operating lever 390. By rotation of the lever the couplet may be shifted either to a high speed position, a low speed position, or to an intermediate or stop position in which the motor becomes disconnected from the spindle.

In this machine rotation of the spindle motor is controlled entirely by a pressure switch, indicated generally by the reference numeral 391, Figure 5. The usual forward and reverse starters 392 and 393 are provided for the motor and each starter has a starting coil 394 and 395 respectively. One end of these coils is connected by a line 396 to one side of a transformer 397. The other side of the transformer is connected by a line 398 to a contact 399 of the pressure switch. The other contact 400 of the pressure switch is connected by a line 401 to a selector switch lever 402. This lever has three positions comprising a central or stop position, a second position in which it engages a contact 403 to effect forward rotation of the motor, and a third position in which it engages a contact 404 for causing reverse rotation of the motor.

The forward contact 403 is connected by a line 405 to contact 406 in the reverse starter 393 and when this starter is open the contact is connected by switch member 407 to a contact 408, thereby completing a circuit through line 409 to the starter coil 394. Similarly, the contact 404 is connected by a line 410 to contact 411 of starter switch 392 and when this switch is open the contact 411 is connected by the switch member 412 to contact 413, thereby completing a circuit through line 414 to the starter coil 395. Thus, when the switch 402 is in either its second or its third position the pressure switch 391 may close the circuit to one of the starter coils and operate the respective switch member to cause forward or reverse rotation of the motor.

The motor shown is a three-phase motor and therefore has three lines 414', 415, and 416 which are connected by the reverse switch 393 to the power mains 417, 418, and 419 respectively while these same lines are connected by the forward switch 392 to lines 419, 418, and 417 respectively which provides for the opposite direction of rotation of the motor. Since means are provided for intermittently opening and closing the pressure switch in accordance with feeding movements of the table, it is desirable that the motor be stopped as soon as possible after the switch has opened and thereby prevent idle rotation of the cutter as much as possible. This is accomplished by providing a plugging switch, which is indicated generally by the reference numeral 420.

This switch has a drive pulley 421 which is driven by a V-belt 422 from a small V-pulley 423 attached to the end of the motor armature shaft 365. This switch operates on the principle that upon rotation in one direction the contact 424 is moved into engagement with the contact 425 and upon reverse rotation the contact 426 is moved into engagement with the contact 427.

This switch may be of any suitable commercial type and does not form any part of the present invention. When the contacts 424 and 425 close they complete a circuit from one side of the transformer 397 to the contact 411 of the forward starter switch 392 which at this time is closed, thereby disconnecting contact 411 from contact 413. Since the contact 413 is connected to the starter coil 395 it will be evident that as soon as the motor circuit is open as by opening of the pressure switch that the contacts 411 and 413 will be closed and thereby establish a circuit to the reverse starter coil which will apply a reversing current to the motor, immediately slowing it down. When the speed of the motor has dropped to a predetermined low, the contacts 424 and 425 separate, permitting the motor to idle to a stop. The contacts 426 and 427 of the plugging switch perform the same function for the opposite direction of rotation of the motor.

Figure 6:
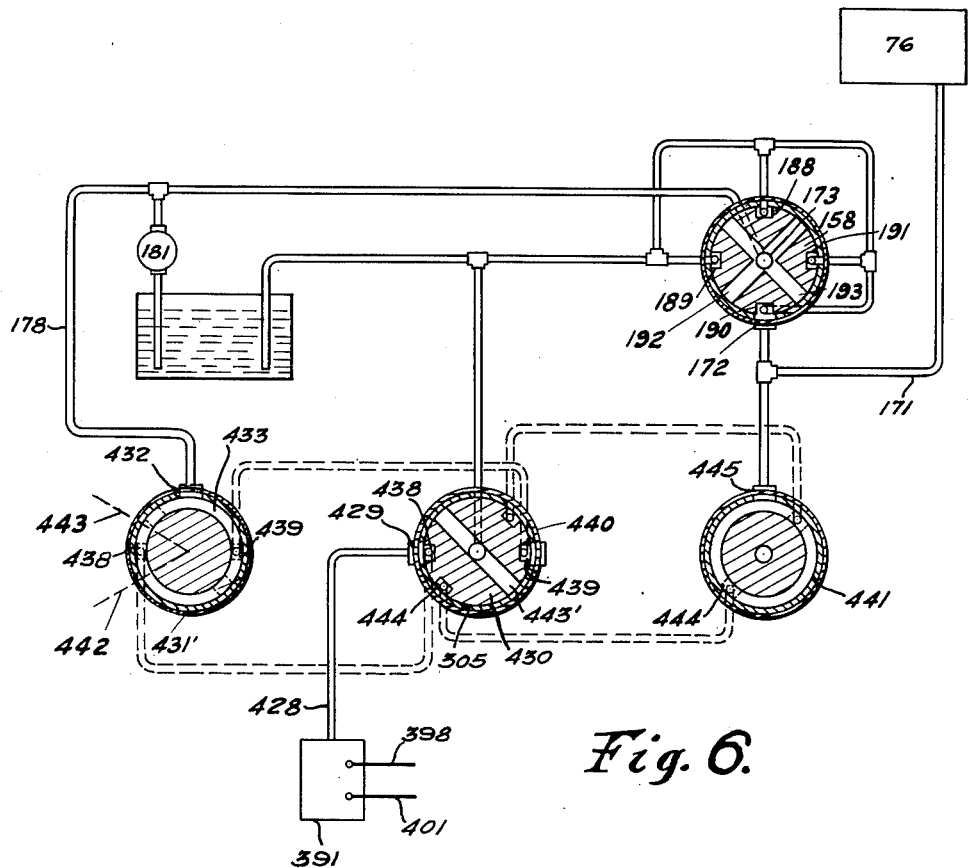
Figure 6 is a diagrammatic view of a control circuit for controlling the starting and stopping of the spindle, with the valving shown in the spindle run position.

The operation of the pressure switch is controlled from the hydraulic circuit shown in Figure 6 and is illustrated as connected by a channel 428 to a port 429 of a spindle selector valve 305. This valve has a rotatable plunger 430 which is adapted to be rotated by a control lever 431 attached to the end thereof and mounted on the front of the machine as shown in Figure 1. This lever is capable of positioning the valve in any one of three positions, the central position in which it is shown being known as the "spindle run" position.

Sections through the spindle control valve are shown in Figure 6 of the drawings, and it will be noted that in section 431' there is a pressure port 432 which is directly connected to the pump supply line 178. This port communicates with an annular groove 433 in plunger 430 which is thus always under pressure. A pair of opposed axially extending grooves 438 and 439 in the periphery of the plunger 430 extend from section 431' to section 440.

Figure 8:
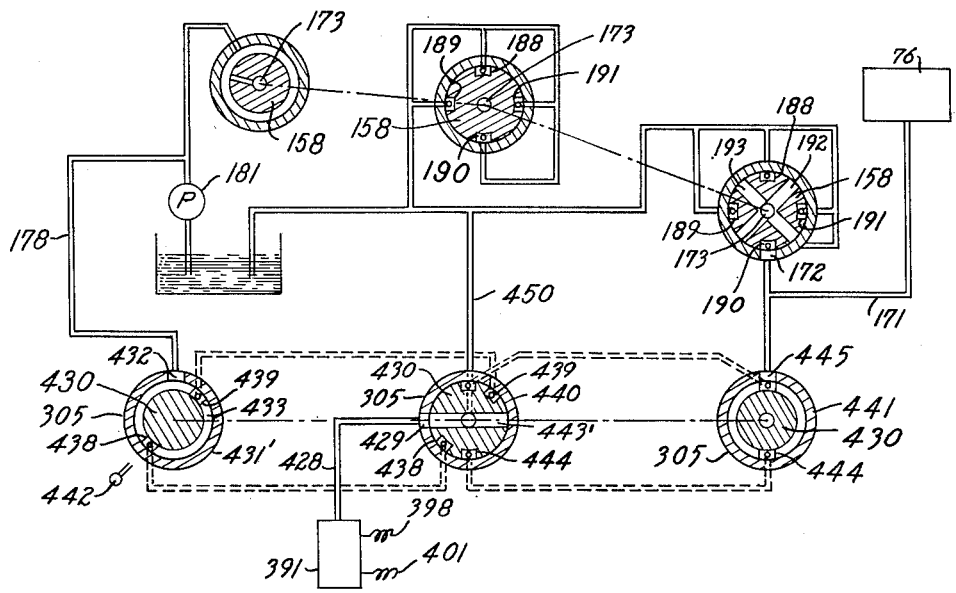
Figure 8 is a view similar to Figure 7 with the spindle control valve in spindle stop position.

Since the groove 438 is therefore under pressure it will supply pressure to port 429 and thereby to supply line 428 of the pressure switch. This will maintain the switch closed and keep the spindle running as long as the electric selector switch 402 is positioned in either one of its running positions. When the lever 431 is rotated counterclockwise to the position indicated by the dotted line 442 in Figure 1 which is known as the "spindle stop" position, the port 429 becomes connected to a cross bore 443' as shown in Figure 8 which leads to reservoir as diagrammatically indicated by channel 450, thereby releasing the pressure switch 391 and stopping the rotation of the spindle.

Figure 7:
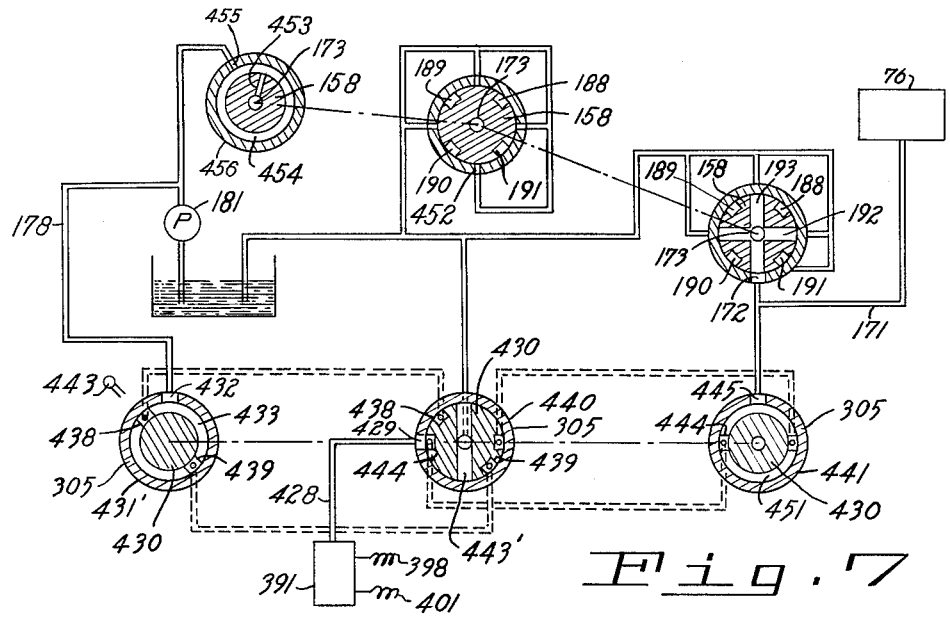
Figure 7 is a view similar to Figure 6 with the spindle control valve in automatic spindle position.

When the lever 431 is rotated clockwise to the position indicated by the reference numeral 443 thereby positioning the valve as shown in Figure 7, which position is known as "Automatic spindle" position, the pressure switch is so connected that whenever the table starts to move at a feed rate the spindle is automatically started but during table rapid traverse or stop the spindle is stopped. This is accomplished by connecting the port 429 to an axial groove 444 in the periphery of plunger 430 which as shown in Figure 7 extends to section 441 at which it terminates in an annular groove 451 in valve plunger 430 that is always in communication with port 445 and thereby to the supply line 171 which leads to a table feed clutch 76. Thus, whenever the line 171 is under pressure, the feed clutch is energized and the pressure switch is turned on; and when the line 171 is connected to reservoir, the feed clutch is deenergized and the pressure switch is turned off.

The reference numeral 158 indicates a rotatable valve plunger which determines the pressure condition in line 171 and thereby actuation of the feed clutch. When the plunger is in the position shown in Figure 6, the axially extending grooves 188, 189, 190, and 191 in the periphery of the valve, which are exhaust grooves couplable to reservoir through portings shown in section 452 of valve 158, have one of their number in registry with the port 172, whereby the feed clutch is disengaged. When the valve 158 is rotated 45 degrees from this position in either direction as shown in Figure 7 an end of one of the cross drilled holes 192, 193, registers with the port 172 and the feed clutch is engaged because an axial pressure bore 173 which is always connected to the pump 181 through the radial bore 453, annular groove 454, and port 455 shown in section 456 intersects the cross drilled holes and keeps them always under pressure.

The valve plunger 158 is rotatable in opposite directions, in accordance with the structure shown in the copending application, to different positions for different operating effects, but regardless of the position, whenever an end of the cross pressure bores 192, 193 registers with port 172, the port 445 is put under pressure, and with the spindle control valve in automatic position as shown in Figure 7, this will cause automatic closing of the spindle control switch simultaneously with engagement of the feed clutch.

It is obvious that if the spindle control valve plunger 430 is in the position shown in Figure 8, automatic control of the spindle is prevented so that the operator may cause movement of the table, as for positioning purposes, without rotation of the spindle.

There has thus been provided an improved spindle driving mechanism in which the driving of the spindle may be controlled at will manually, or automatically in accordance with feed movement of the work table.

What is claimed is:

1. In a milling machine having a work supporting table and a rotatable tool spindle, the combination of control means for said table including a fluid operable feed control member, a spindle transmission, control means therefor including a fluid operable start and stop switch member, a source of fluid pressure, independent control valve means for each of said fluid operable members for connecting said source of pressure thereto, one of said control valve means providing in one position a passage for connecting its controlled member to the other control valve means for joint operation of both of said controlled members by said other control valve means.

2. In a milling machine having a rotatable tool spindle and a work supporting table movable transversely of said spindle, the combination of a fluid operable feed control clutch for the table, a fluid pressure channel therefor, valve means having one position for connecting a source of fluid pressure to said channel to effect feeding of the table, a spindle transmission including a prime mover and a pressure actuated start and stop switch therefor, a second valve means alternatively positionable to connect and disconnect said source of pressure to and from said switch, said last-named valve means also having a passage selectively positionable to connect said switch to said channel whereby when said channel is connected to pressure by said first-named valve means the switch will be jointly operated with said clutch.

3. In a milling machine, a movable work supporting table, a fluid pressure control means for starting and stopping the feed movement of the table including a feed control channel subjected to fluid pressure in the starting position of said control means only, a rotatable tool spindle, transmission means for said spindle including a prime mover, a control circuit for said prime mover including a pressure operated switch for controlling the starting and stopping of said prime mover, a source of pressure including a reservoir, a control valve, and means connecting said source of pressure to said control means and to said control valve, said control valve having a first position for connecting said switch to reservoir, a second position for connecting said switch to said source of pressure and a third position for connecting said switch to said feed control channel whereby the starting and stopping of said prime mover may be automatically controlled from the table transmission.

4. In a milling machine having a work supporting table and a rotatable tool spindle, the combination of a feed control clutch for said table, a channel for supplying fluid pressure for operation of the clutch, a source of pressure, a valve for connecting said source of pressure to said channel, power operable means for controlling rotation of the spindle, including a fluid operable switch, a control valve having a first position for connecting said switch to said source of pressure for several control of the spindle and a second position for connecting said switch to said channel for joint control by said first-named valve, and a third position for connecting said switch to reservoir.

5. In a milling machine having a table, a tool spindle, and transmission means including a prime mover, a starting switch for said prime mover, a feed control clutch for the table, control means for the clutch including a rotatable valve having a feed rate position, a spindle control selector valve having a stop position, a spindle running position and a third position for operatively connecting said starting switch for control by said rotatable valve to render the rotatable valve effective for simultaneous initiation of a feed rate to said table and rotation of the spindle, and a direction control switch in series with said starting switch for determining the direction of rotation of said spindle.

ERWIN G. ROEHM.
HANS FRITSCHI.

REFERENCES CITED

The following references are of record in the file of this patent:

UNITED STATES PATENTS

| Number | Name | Date |
|---|---|---|
| 1,978,354 | Nenninger et al. | Oct. 23, 1934 |
| 2,076,859 | Nenninger | Apr. 13, 1937 |
| 2,123,825 | De Vlieg | July 12, 1938 |
| 2,240,973 | Armitage | May 6, 1941 |
| 2,337,223 | Armitage | Dec. 21, 1943 |
| 2,349,595 | Martellotti | May 23, 1944 |